US009900755B2

United States Patent
Bhattacharya

(10) Patent No.: US 9,900,755 B2
(45) Date of Patent: Feb. 20, 2018

(54) END TO END DATA SIGNAL CONSISTENCY EVALUATION

(71) Applicant: Pearson Education, Inc., New York, NY (US)

(72) Inventor: Dibyendu Bhattacharya, Bangalore (IN)

(73) Assignee: PEARSON EDUCATION, INC., New York, NY (US)

( * ) Notice: Subject to any disclaimer, the term of this patent is extended or adjusted under 35 U.S.C. 154(b) by 109 days.

(21) Appl. No.: 15/006,958

(22) Filed: Jan. 26, 2016

(65) Prior Publication Data

US 2017/0215049 A1   Jul. 27, 2017

(51) Int. Cl.
| | |
|---|---|
| G01R 31/08 | (2006.01) |
| H04W 4/14 | (2009.01) |
| H04W 72/04 | (2009.01) |
| H04W 24/04 | (2009.01) |
| H04L 12/743 | (2013.01) |
| H04W 76/02 | (2009.01) |
| H04L 1/08 | (2006.01) |
| H04W 4/00 | (2018.01) |

(52) U.S. Cl.
CPC ............... *H04W 4/14* (2013.01); *H04L 1/08* (2013.01); *H04L 45/7453* (2013.01); *H04W 4/008* (2013.01); *H04W 24/04* (2013.01); *H04W 72/0406* (2013.01); *H04W 76/023* (2013.01)

(58) Field of Classification Search
CPC .......... G06F 17/3053; G06F 17/30867; H04L 47/2475; H04L 47/283; H04L 67/22; H04L 67/306
See application file for complete search history.

(56) References Cited

U.S. PATENT DOCUMENTS

| | | | |
|---|---|---|---|
| 2004/0088540 A1* | 5/2004 | Marturano | H04M 3/42008 713/156 |
| 2011/0264905 A1* | 10/2011 | Ovsiannikov | H04L 29/08792 713/151 |
| 2017/0180504 A1* | 6/2017 | McFall | H04L 67/306 |

* cited by examiner

*Primary Examiner* — Minh-Trang Nguyen
(74) *Attorney, Agent, or Firm* — Kilpatrick Townsend & Stockton LLP

(57) ABSTRACT

Systems and methods for verifying end-to-end data consistency are disclosed herein. The system can include a source hub that can: generate a first message from data received from a user; and generate an initial message identifier. The system can include an intermediate hub that can: receive the first message from the source hub via the communication network; receive the initial message identifier from the source hub via the communication network; transmit an output message; and generate an output message identifier. The system can include a terminal hub that can: receive the output message; receive the output message identifier; calculate a result value from the received output message and the received output message identifier; and provide an alert to a user device when a data loss is identified based on the result value.

20 Claims, 9 Drawing Sheets

END TO END DATA SIGNAL CONSISTENCY EVALUATION

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

As the volume of data has increased, the volume of data that has been lost or damaged in transit has likewise increased. Accordingly, further developments are needed.

BRIEF SUMMARY

One aspect of the present disclosure relates to a system for verifying end-to-end data consistency. The system includes: a source hub including a computing device. Computer code stored in memory associated with the source hub can control the source hub to: generate a first message from data received from a user; and generate an initial message identifier. In some embodiments, the initial message identifier identifies content of the first message. The system can include an intermediate hub including a second computing device connected to the source hub via a communication network. The second Computer code stored in memory associated with the intermediate hub can control the intermediate hub to: receive the first message from the source hub via the communication network; receive the initial message identifier from the source hub via the communication network; transmit an output message; and generate an output message identifier. In some embodiments, the initial message identifier identifies content of the output message. The system can include a terminal hub having a third computing device connected to the intermediate hub via the communication network. Computer code stored in memory associated with the terminal hub can control the terminal hub to: receive the output message; receive the output message identifier; calculate a result value from the received output message and the received output message identifier; and provide an alert to a user device when a data loss is identified based on the result value.

In some embodiments, computer code stored in memory associated with the terminal hub can control the terminal hub to generate a received message value from the received message. In some embodiments, the received message value comprises a binary representation of all or portions of the received message. In some embodiments, the received message value is calculated by applying a hash function to the received message. In some embodiments, the result value is calculated via a XOR operation on the received output message identifier and the received message value.

In some embodiments, computer code stored in memory associated with the terminal hub can control the terminal hub to alert the source hub to retransmit the first message. In some embodiments, retransmitting the first message includes: regenerating the first message; and regenerating the first message identifier. In some embodiments, computer code stored in memory associated with the terminal hub can control the terminal hub to alert the intermediate hub to retransmit the output message. In some embodiments, retransmitting the output message includes regenerating the output message identifier.

In some embodiments, computer code stored in memory associated with the intermediate hub can control the intermediate hub to calculate a check value in response receiving an alert to retransmit the output message. In some embodiments, the check value is calculated by applying a XOR operation to the received first message and the received initial message identifier.

One aspect of the present disclosure relates to a method of identifying missing data via the generation of a result value. The method includes: receiving a communication at a node including a first computing device from a previous node including a second computing device via a communications network. In some embodiments, the communication includes data. The method includes: receiving an existing value from the previous node via the communications network, which existing value includes an output of a calculation performed by the previous node; calculating at the node with the first computing device a consumed message identifier based on the data of the received communication, which consumed message identifier includes a plurality of binary values representative of the data of the received communication; calculating a result value at the node with the first computing device, which result value is calculated based on the received existing value and the consumed message identifier; determining at the node with the first computing device a data loss based on the result value; and transmitting an alert identifying the data loss via the communications network.

In some embodiments, the result value is calculated by a XOR operation of the existing value and the consumed message identifier. In some embodiments, data loss is determined when the result value is non-zero. In some embodiments, the received communication includes a single message. In some embodiments, the received communication comprises a plurality of messages. In some embodiments, a consumed message identifier is calculated for each of the messages in the received communication.

In some embodiments, the alert includes a request for retransmission of the communication from the previous node to the node. In some embodiments, the method includes: generating an output communication, which output communication contains the data of the received communication; generating at the node with the first computing device an output communication identifier based on the data of the output communication, which output communication identifier includes a plurality of binary values representative of the data of the output communication; and calculating an output value at the node with the first computing device. In some embodiments, the output value is calculated based on the received existing value and the consumed message identifier and the output communication identifier.

In some embodiments, the output value is calculated by a XOR operation of the existing value and the consumed message identifier and the output communication identifier. In some embodiments, the method includes: identifying a next node; sending the output message to the next node; and sending the output value to the next node. In some embodiments, the method includes sending at least one of: (1) the result value; and the output value to a database.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
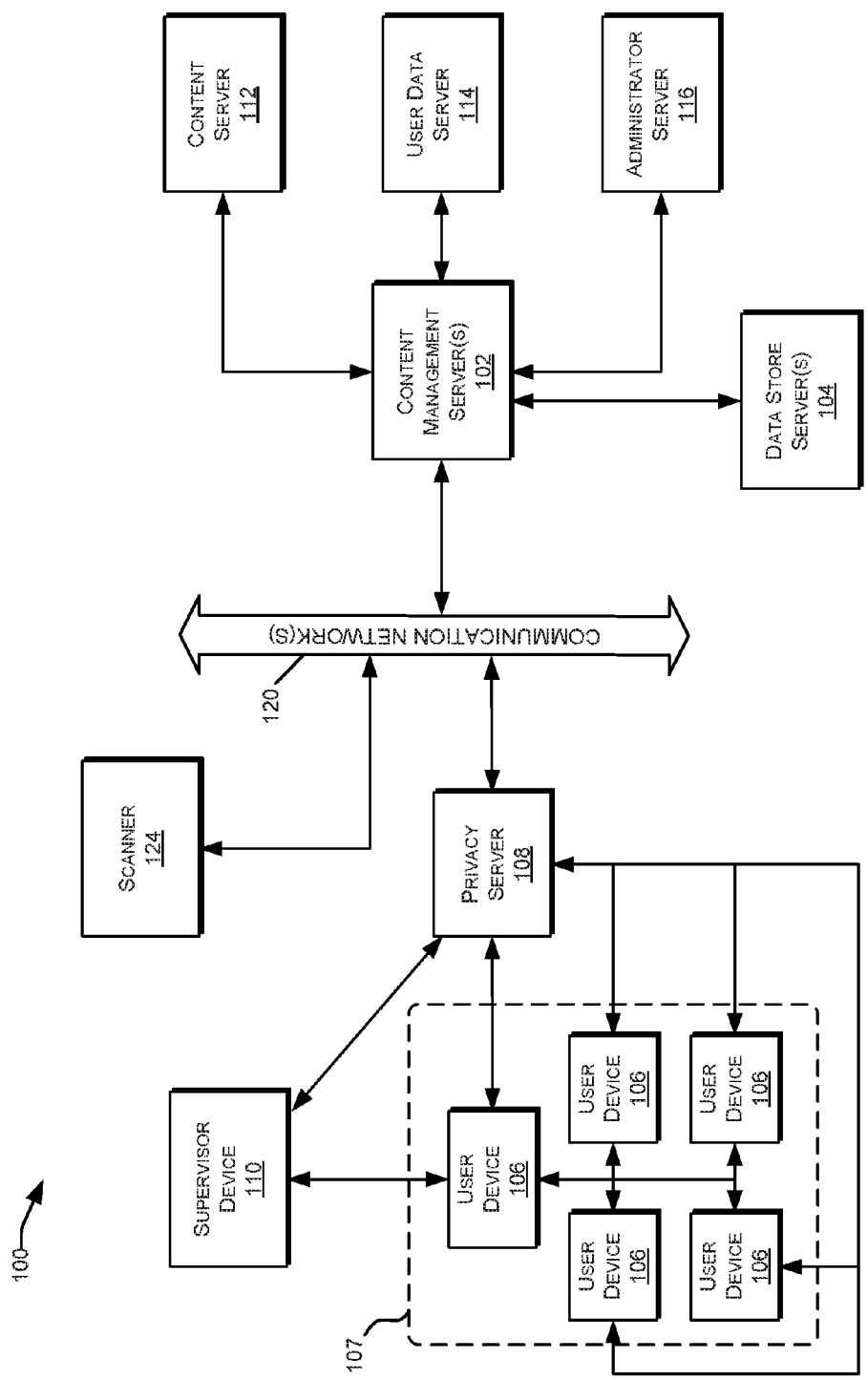
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
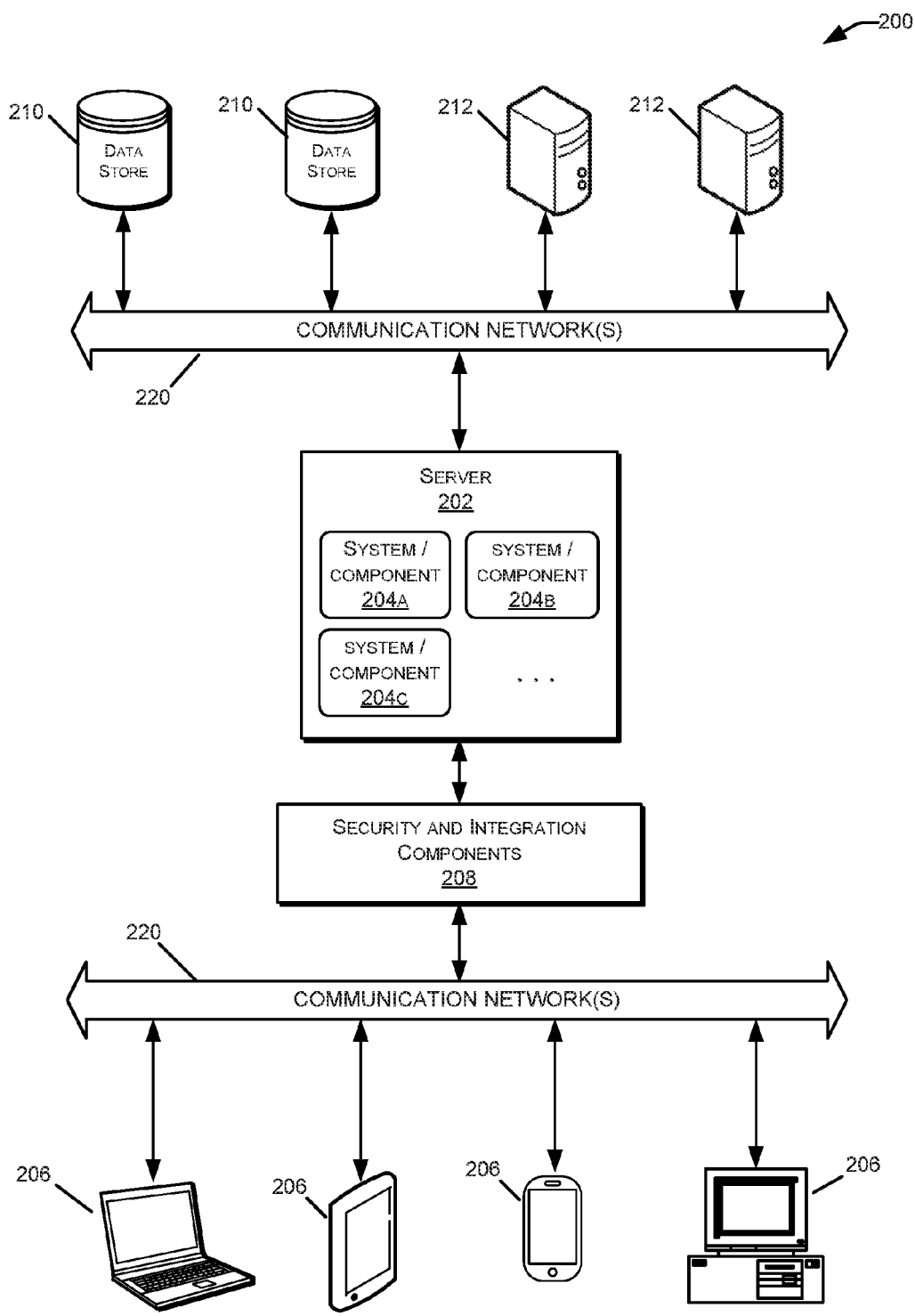
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
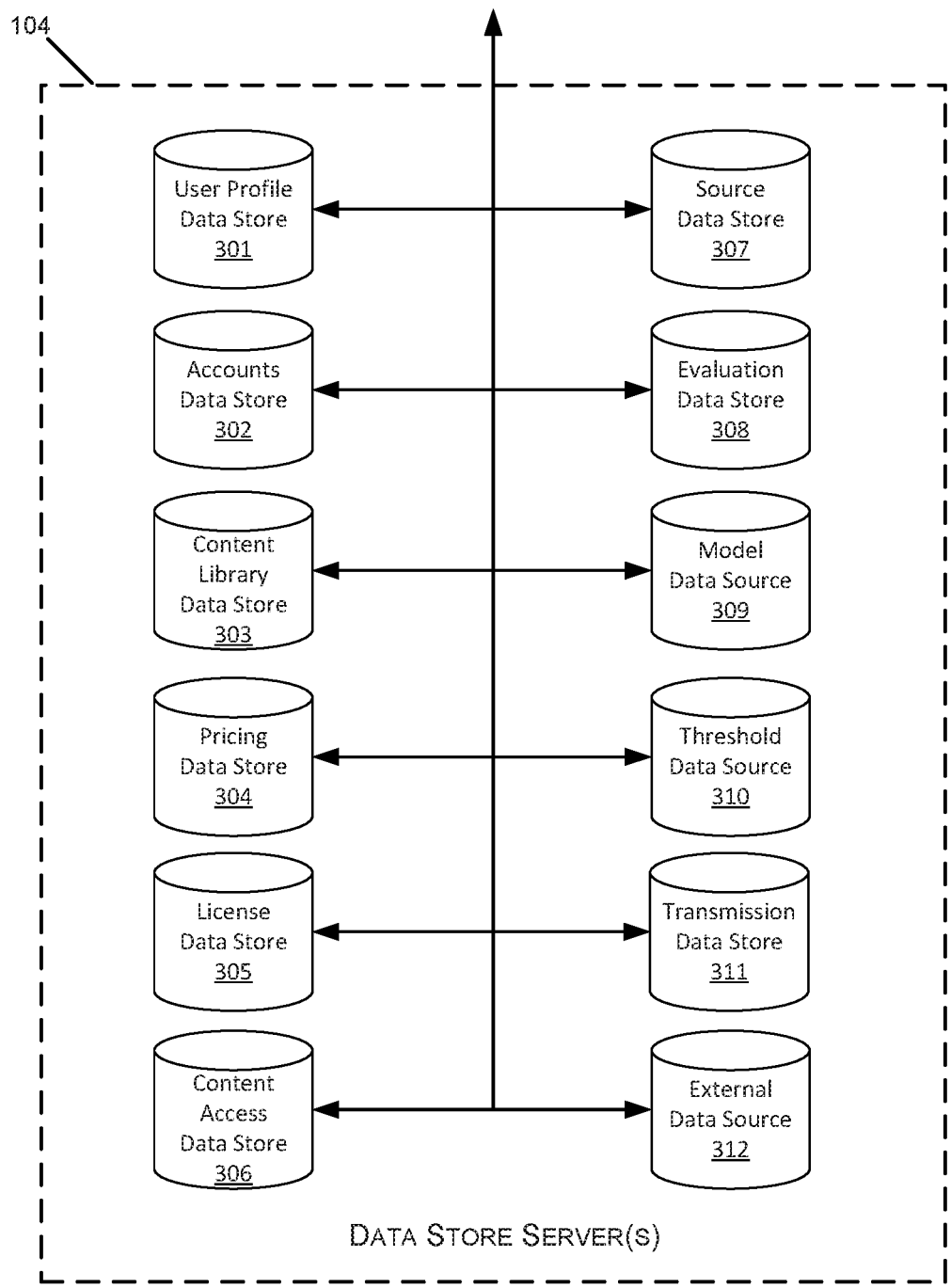
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-312 may be accessed by the content management server 102 and/or other devices and servers within the network 100 (e.g., user devices 106, supervisor devices 110, administrator servers 116, etc.). Access to one or more of the data stores 301-312 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A thread data store 309, also referred to herein as a thread database 309 can include information relating to one or several conversation threads, which can each include one or several user posts. In some embodiments, the thread data store 309 can include thread information identifying, for example, the number of users that can access a thread, the access level(s) of the users that can access a thread including, for example, a read-only access level, a read-write access level, or the like. In some embodiments, the thread information can include thread metadata that can identify one or several aspects of the thread including, for example, thread content, post or comment information, or the like. In some embodiments, the thread information can include thread user data that can track one or several user interactions with the thread such as, for example, user posts to the thread, metadata of user posts to the thread, activity level in the thread, or the like.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

A transmission data store 311 can include information relating to the transmission of information through the communication network 120. In some embodiments, this information can be specifically received from one or several hubs 602, 604, 606 relating to the transmission of information through those one or several hubs 602, 604, 606. In some embodiments, this information can relate to the performance of one or more of the hubs such as information identifying the time of transmission, the transmission speed, any transmission anomalies, or the like. In some embodiments the transmission database 311 can include information for some or all of the hubs. This information can identify, for example, the number of times that a hub has been identified as an error hub, the percent of transmissions in which the hub is identified as an error hub, or the like. In some embodiments, the transmission database can further include information In addition to the illustrative data stores described above, data store server(s) 104 (e.g., database servers, file-based storage servers, etc.) may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party data stores containing demographic data, education related data, sales data, health related data, and the like. Illustrative external data aggregators 312 may include, for example, social networking web servers, public records data stores, learning management systems, educational institution servers, business servers, consumer sales data stores, medical record data stores, etc. Data retrieved from various external data aggregators 312 may be used to verify and update user account information, suggest user content, and perform user and content evaluations.

Figure 4:
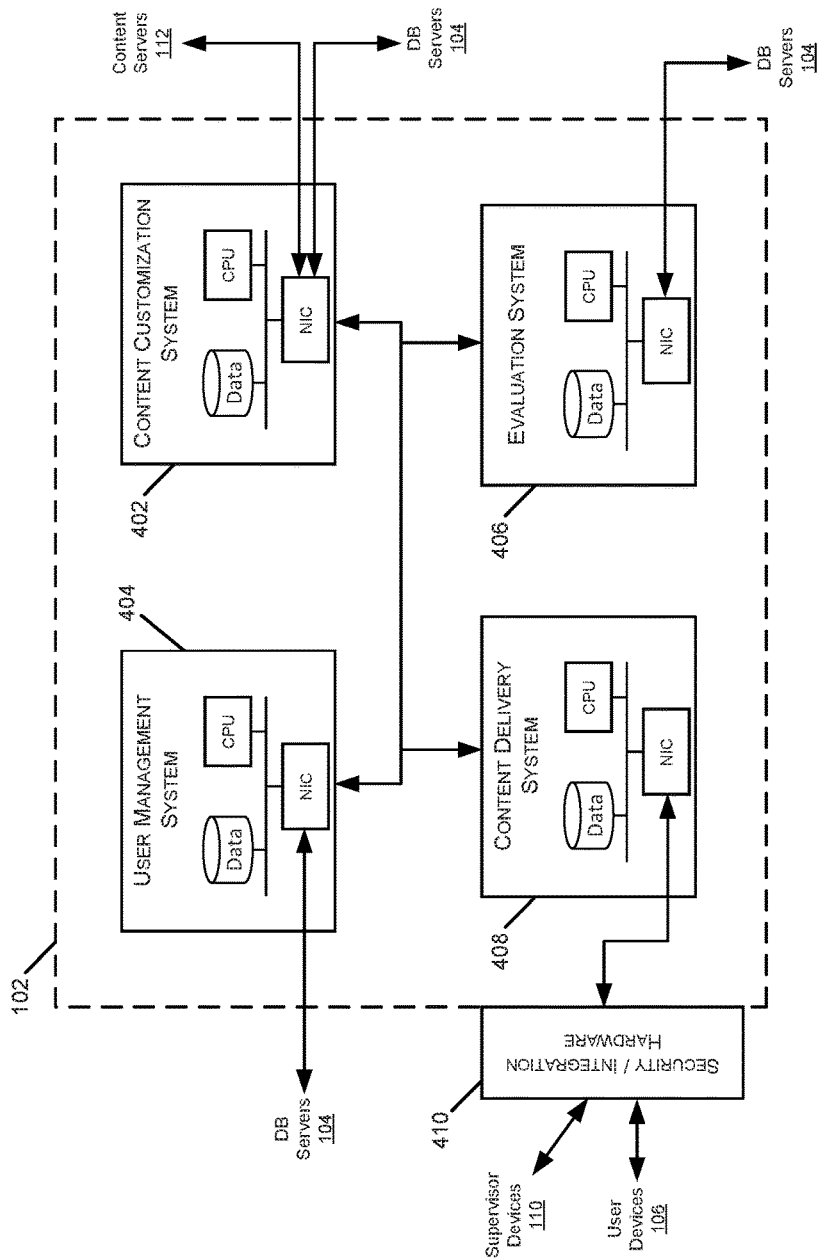
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
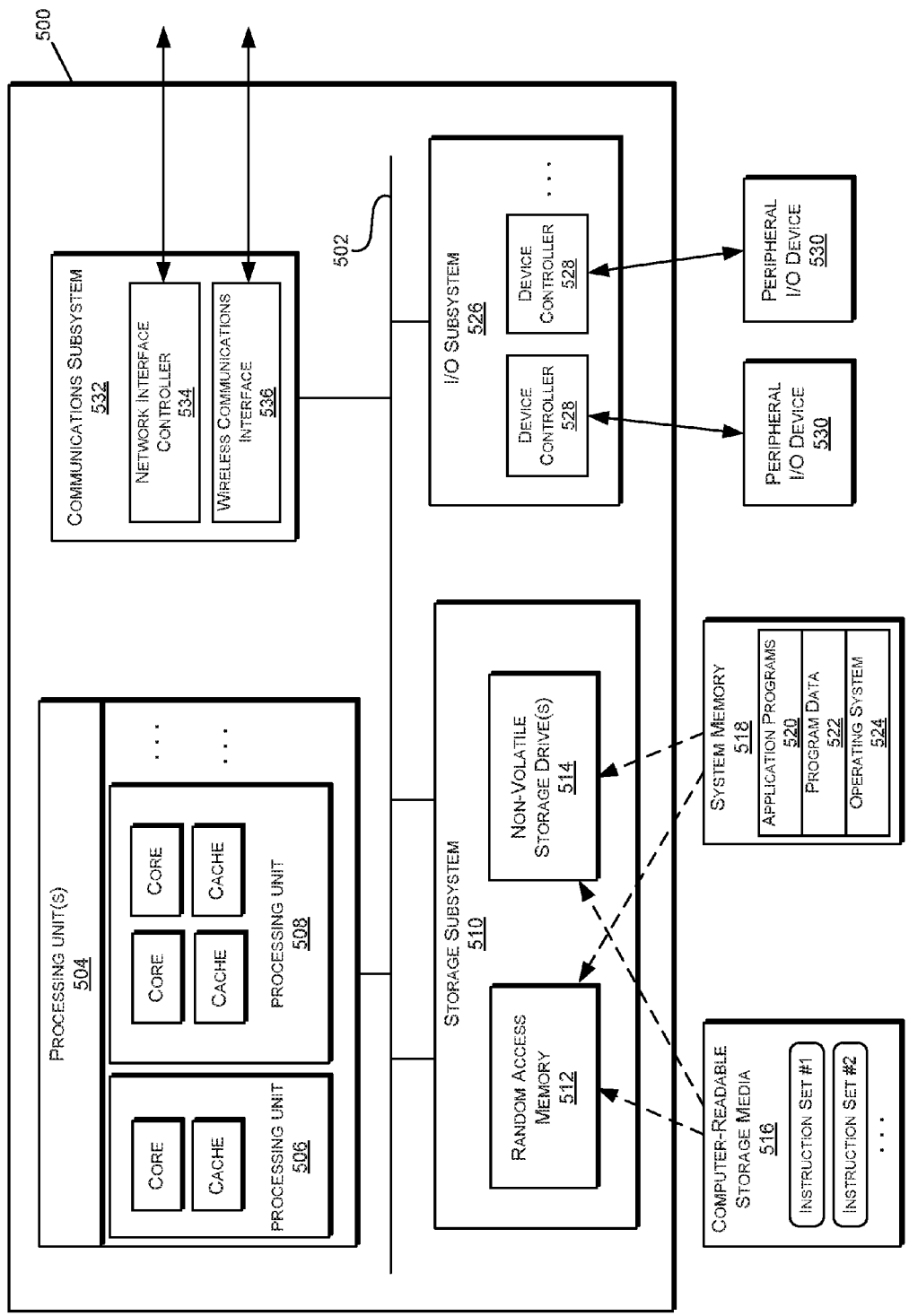
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
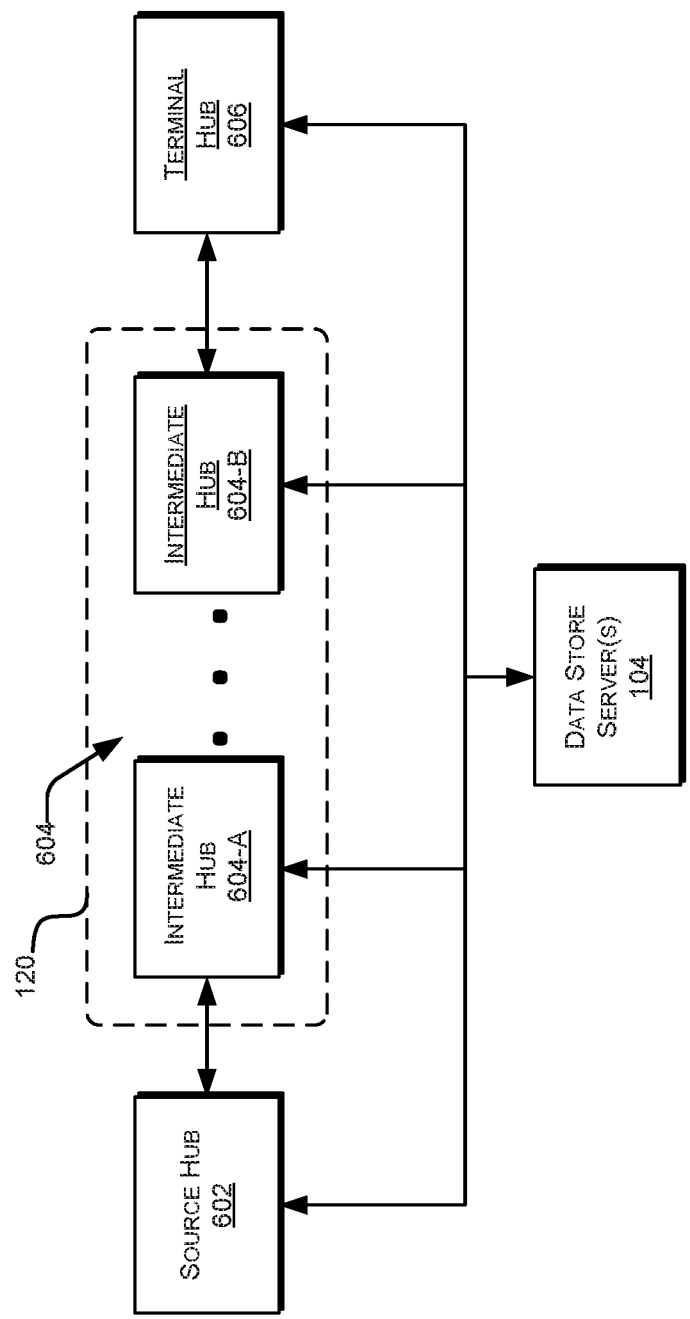
FIG. 6 is a block diagram illustrating one embodiment of the communication network.

With reference now to FIG. 6, a block diagram illustrating one embodiment of the communication network 120 is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
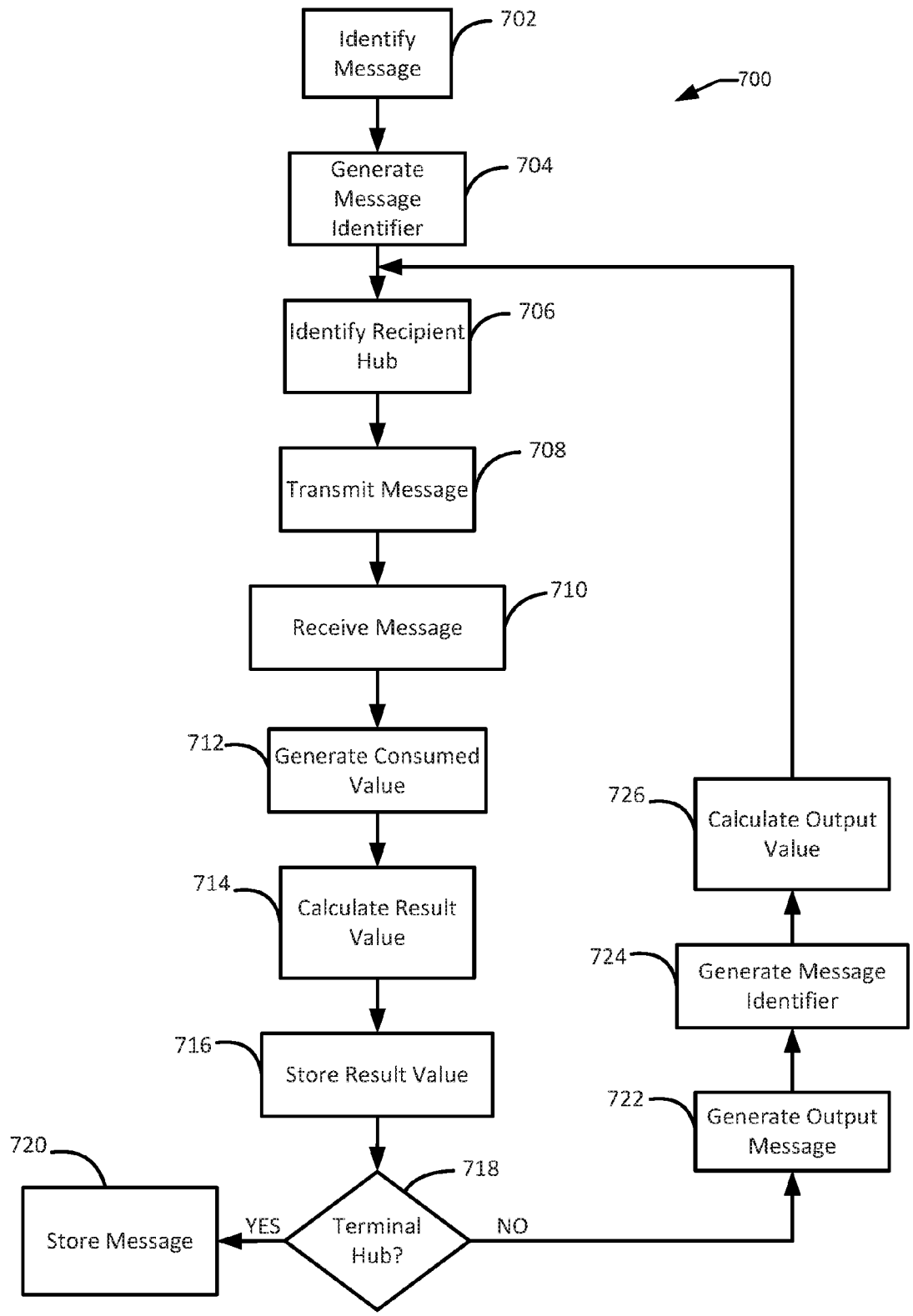
FIG. 7 is a flowchart illustrating one embodiment of a process for verifying end-to-end data consistency.

With reference now to FIG. 7, a flowchart illustrating one embodiment of a process 700 for verifying end-to-end data consistency is shown. In some embodiments, the process 700 can be performed by some or all of the components of the content distribution network 100, and specifically by some or all of the hubs 602, 604, 606 identified in FIG. 6. The process begins at block 702, wherein a message is identified and/or selected. In some embodiments, this message can be a single message, and in some embodiments, this message can include a plurality of messages. In some embodiments, this can be a message designated for sending from one of the hubs 602, 604 to another of the hubs 604, 606.

After the message has been identified and/or selected, the process 700 proceeds to block 704, wherein a message identifier is generated, and specifically wherein an initial message identifier is generated. In some embodiments, the message identifier can identify content of the message identified in block 702. In some embodiments, the message identifier can be a text string comprising one or several characters. In some embodiments, the message identifier can comprise a binary number encoding all or portions of the message. In some embodiments the binary number can be generated by identifying the all or portions of the message for conversion to binary. Then, each of the characters in the selected all or portions of the message are converted into its decimal equivalent according to ASCII standards. The decimal equivalent can then be converted into binary. Alternatively, in some embodiments, the selected all or portions of the message can be converted into binary using any desired character-to-binary software.

In some embodiments in which the message comprises a plurality of messages, a message identifier can be generated for each of the plurality of messages, and these message identifiers can then be combined to generate a single message identifier for all of the plurality of messages. In some embodiments, these message identifiers can be combined according to any desired algorithm such as, for example, one or several hash algorithms. In some embodiments, these identifiers can be combined according to a logical operator/operation such as an "Exclusive Or" (XOR) operation. In embodiments in which the plurality of message identifiers are binary values, the XOR operation outputs another binary value characterizing the aggregate of the plurality of message identifiers.

After the message identifier has been generated, the process 700 proceeds to block 706, wherein the recipient hub is identified. In some embodiments, the recipient hub can be the next hub to receive the message, which next hub can be an intermediate hub 604 or a terminal hub 606. In some embodiments, the recipient hub 604, 606 can be selected by the server 102.

After the recipient hub has been identified, the process 700 proceeds to block 708, wherein the message is transmitted. In some embodiments, the message can be transmitted in the form of one or several electrical signals via a wired or wireless communications network. In some embodiments, the transmission of the message can further include the transmission of the message identifier generated in block 704.

After the message has been transmitted, the process 700 proceeds to block 710, wherein the message is received by the recipient hub. In some embodiments, the received message can be a single message, and in some embodiments, the received message can be a plurality of messages.

After the message has been received, the process 700 proceeds to block 712, wherein the consumed identifier, also referred to herein as a consumed message identifier, or consumed value, also referred to herein as a consumed message value, is determined. As used herein, a consumed value is a subset of consumed identifier. In some embodiments, the consumed identifier can include any characters in a text string and the consumed value can include numeric characters in a text string. In some embodiments, the consumed identifier can correspond to the message identifier in that the consumed identifier can be created in the same way as the message identifier. In some embodiments, while the consumed identifier and the message identifier are created in the same way, they are created from different content as the message identifier is created from the message and the consumed identifier is created from the consumed message.

In embodiments in which a plurality of messages is received, a consumed identifier can be generated for each of the received messages. In some embodiments, the plurality of consumed identifiers can be aggregated to generate a single consumed identifier for all of the plurality of received messages. In some embodiments, these consumed identifiers can be combined according to any desired algorithm such as, for example, one or several hash algorithms. In some embodiments, these consumed identifiers can be combined according to a logical operator/operation such as an "Exclusive Or" (XOR) operation. In embodiments in which the plurality of consumed identifiers are binary values, the XOR operation outputs another binary value characterizing the aggregate of the plurality of consumed message identifiers.

After the consumed identifier has been generated, the process 700 proceeds to block 714, wherein a result value is calculated. In some embodiments, the result value can be calculated from the received message and the received message identifier, more specifically, the result value can be calculated from the received message identifier and from the consumed identifier which is generated from the received message. In embodiments in which the received message comprises a plurality of messages, the result value can be calculated from received message identifiers or from the single value characterizing all of the message identifiers and from the plurality of consumed identifiers or from the single value generated from all of the plurality of consumed identifiers. The result value can contain information that can indicate whether the received message matches the generated and sent message, and can specifically indicate whether any data or portion of the generated and sent message is different than that of the received message. In some embodiments, the result value can be generated according to any desired algorithm such as, for example, one or several hash algorithms. In some embodiments, the result value can be generated according to a logical operator/operation such as the XOR operation. In embodiments in which received message identifier and the consumed identifier are binary values, the XOR operation outputs another binary value characterizing the aggregate of the plurality of consumed message identifiers.

In some embodiments, the generation of the result value can further include the determination of whether the result value is indicative of differences between the generated message and the received message. In some embodiments in which the XOR operation is used, this can include determining whether the result value is zero or non-zero. In some embodiments, a result value that is zero indicates that the received message matches the generated message and a result value that is non-zero indicates that the received message does not match the generated message.

After the result value has been generated, the process 700 proceeds to block 716, wherein the result value is stored. In some embodiments, the result value can be stored in the database server 104, and specifically in the transmission data store 311. In some embodiments, the hub 604, 606 generating the result value can provide the result value to the transmission data store 311, and specifically can transmit the result value to the transmission data store 311 via one or several electrical signal communicated via a wired or wireless communication network.

After the result value has been stored, the process 700 proceeds to decision state 718, wherein it is determined if the recipient hub is the terminal hub 606. In some embodiments this can include determining if the received message and/or data of the received message should be resent to another hub 604, 606. If it is determined that the recipient hub is the terminal hub 606, then the process 700 proceeds to block 720, wherein the message is stored. In some embodiments, the message can be stored at the terminal hub 606 and/or at the database server 104, and specifically in the database in the database server 104 corresponding to the content of the message. Thus, for example, if the received message relates to user data, then the received message can be stored in the user profile database 301.

Returning again to decision state 718, if it is determine that the recipient hub is not a terminal hub, then the process 700 proceeds to block 722, wherein an output message is generated. In some embodiments, this output message can be one message that matches the received message in that it contains the same data as the received message, or the output message can be a plurality of message that, when taken together, match the received message in that they contain the same data as the received message. After the output message has been generated, the process 700 proceeds to block 724, wherein a message identifier, and specifically an output message identifier is generated. In some embodiments, the output message identifier can identify content of the message generated in block 722. The output message identifier can be generated in a similar manner to the message identifier discussed in block 704.

After the output message identifier has been generated, the process 700 proceeds to block 726, wherein an output value is calculated. In some embodiments, the output value can be calculated from the result value and the output message identifier. In embodiments in which the output message comprises a plurality of output messages, the output value can be calculated from the result value and from the plurality of output message identifiers associated with the plurality of output messages. In some embodiments, the output value can be generated according to any desired algorithm such as, for example, one or several hash algorithms. In some embodiments, the output value can be generated according to a logical operator/operation such as the XOR operation. In embodiments in which result value and the message identifier are binary values, the XOR operation outputs another binary value. After the output value has been calculated, the process 700 returns to block 706, and proceeds as outline above.

Figure 8:
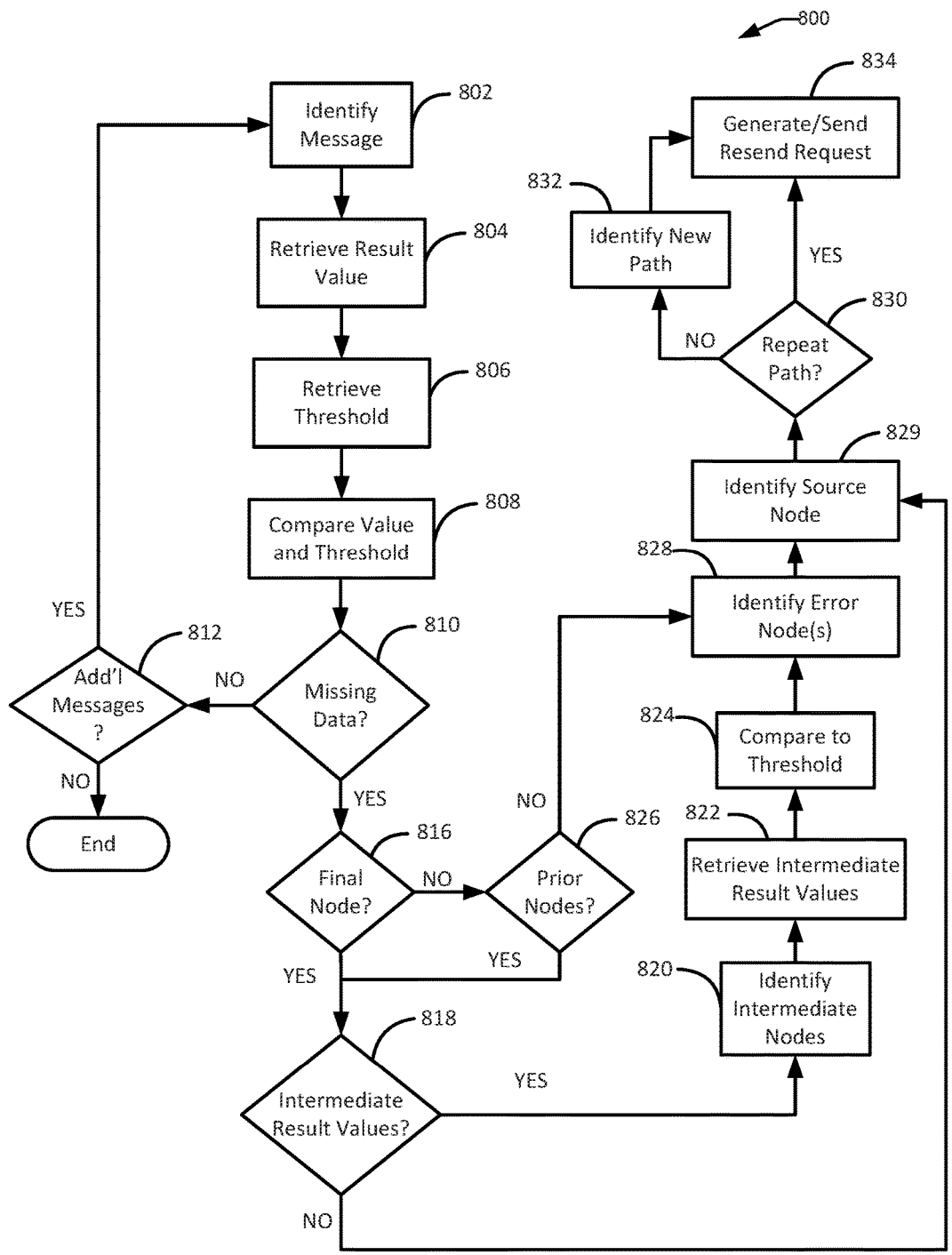
FIG. 8 is a flowchart illustrating one embodiment of a process for controlling hubs to verify end-to-end data consistency.

With reference now to FIG. 8, a flowchart illustrating one embodiment of a process 800 for controlling hubs to verify end-to-end data consistency is shown. The process 800 can be performed by some or all of the components of the content distribution network 100, and specifically by some or all of the hubs 602, 604, 606 identified in FIG. 6 or the server 102 with information received from the hubs 602, 604, 606. The process begins at block 802, wherein a message is identified and/or selected. In some embodiments the identified message can correspond to a message that has already reached a terminal hub 606 or a message that is en route to a terminal hub 606. In some embodiments, the message that is identified can be associated with data stored in the database server 104, and particularly within the transmission data store 311 of the database server 104. In some embodiments, a selection value can be associated with a message when the message is selected for evaluation via process 800. This value can be stored in the database server 104, and specifically can be stored in transmission data store 311.

After the message has been identified, the process 800 proceeds to block 804, wherein one or several result values are retrieved. In some embodiments, the retrieved result value can be the result value generated by the terminal hub 606, and in some embodiments, the retrieved result value can be a result value generated by an intermediate hub 604. The result value can be retrieved from the database server 104, and particularly from the transmission data store 311.

After the result value has been retrieved, the process 800 proceeds to block 806, wherein a threshold value is retrieved. In some embodiments, the threshold value can delineate between result values indicative of a match between the generated message of block 702 and the received message and result values indicative of a mismatch between the generated message of block 702 and the received message. In some embodiments, the threshold value can be retrieved from the threshold database 310.

After the threshold value has been retrieved, the process 800 proceeds to block 808, wherein the result value is compared to the threshold value. In some embodiments, and as a part of this comparison, a first value indicative of missing data can be associated with the identified message if the comparison of the result value and the threshold value indicates a mismatch between the generated message of block 702 and the received message, and a second value indicative of a match can be associated with the identified message if the comparison of the result value and the threshold value indicative a match between the generated message of block 702 and the received message.

After the result value and the threshold value have been compared, the process 800 proceeds to decision state 810, wherein it is determined if there is a mismatch between the generated message of block 702 and the received message, or alternatively, that data is missing from the received message. In some embodiments, this can include determining whether the first value or the second value is associated with the identified message.

If it is determined that there is a mismatch between the generated message and the received message, or alternatively, that data is missing, an alert can be generated and sent. In some embodiments, this can include identifying one or several recipient devices for receiving the alert. This identification can be performed based on information stored in one of the databases such as the user profile database 301. In some embodiments, the recipient device for receiving the alert can be the source hub or any other device used by the user associated with the source hub.

After the one or several alert recipients and/or recipient devices have been identified, the alert can be sent. In some embodiments, the alert can be sent to the recipient devices via the communication network 120. Thus, in some embodiments, the alert can be sent to one or several supervisor devices 110 and/or the user device 106. In some embodiments, the receipt of the alert can result in the launching of an application within the receiving device, and in some embodiments, the alert can include a link that, when selected, launches the application or navigates a webbrowser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining a use location of the devices 106, 110 based on determining if the devices 106, 110 and/or accounts are actively being used. Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

Returning again to decision state 810, if the second value is associated with the message and there is a match between the generated message of block 702 and the received message, then the process 800 proceeds to decision state 812, wherein it is determined if there are additional messages for evaluation. In some embodiments, this can include determining if all of the messages in the transmission data store 311 are associated with a selection value. If there are additional messages, the process 800 can return to block 802 and can proceed as outlined above. If there are no additional messages, then the process can terminate.

Returning again to decision state 810, if the first value is associated with the message and there is a mismatch between the generated message of block 702 and the received message, then the process 800 proceeds to decision state 816, wherein it determines if the source of the result value indicating missing data was the terminal hub, also referred to herein as the terminal node or the final node. In some embodiments, this determination can be made based on information received at the transmission database 311 with the result value. Specifically, in some embodiments, the hubs 602, 604, 606 can provide information to the transmission database 311 indicative of one or several attributes of the hub such as whether the hub is a source hub 602, an intermediate hub 604, or a terminal hub 606. In some embodiments, this information can include information identifying the time of transmission, the transmission speed, any transmission anomalies, or the like. In some embodiments the transmission database 311 can include performance information for some or all of the hubs. This information can identify, for example, the number of times that a hub has been identified as an error hub, the percent of transmissions in which the hub is identified as an error hub, or the like.

If it is determined that the source of the result value indicative of the mismatch between the generated message of block 702 and the received message is the terminal hub, then the process 800 proceeds to decision sate 818, wherein it is determined if the transmission database 311 include intermediate result value. In some embodiments, for example, the transmission database 311 can receive a result value from the terminal hub 606, and in some embodiments the transmission database 311 can receive result values from the terminal hub 606 as well as from one or more intermediate hubs 604. In some embodiments, a result value received from an intermediate hub 604 is an intermediate result value.

If it is determined that the transmission database 311 includes intermediate result values, then the process 800 proceeds to block 820, wherein the intermediate node(s) 604 that provided the intermediate result values are identified, and the process 800 proceeds to block 822 wherein the intermediate result values are retrieved. In some embodiments, the intermediate result values can be retrieved from the transmission database 311, and the intermediate hubs 604 can be identified with information retrieved from the transmission database 311 relating to the identified message.

After the intermediate nodes have been identified and after the intermediate result values have been retrieved, the process 800 proceeds to block 824, wherein the intermediate result value(s) is compared to the threshold value of the threshold retrieved in block 806. After the intermediate values have been compared to the threshold value, the process 800 proceeds to block 828, wherein nodes associated with result values indicative of a mismatch between the generated message at block 702 and the received message are identified as error nodes. In some embodiments, this can include associating a first value indicative of an error node with an intermediate hub if the comparison of the intermediate result value from that intermediate hub and the threshold value indicates a mismatch between the generated message of block 702 and the received message, and associating a second value indicative of a non-error hub with the identified message if the comparison of the result value from that intermediate hub and the threshold value indicates a match between the generated message of block 702 and the received message.

Returning again to decision state 816, if it is determined that the recipient hub is not the terminal hub 606, then the process 800 proceeds to decision state 826, wherein it is determined if there were any prior nodes, and particularly any prior intermediate nodes 604. In some embodiments, this can include determining if any other the identified message is associated with any other intermediate hubs 604. If there are prior nodes, then the process 800 returns to decision state 818 and proceeds as outline above.

If it is determined that there are no prior nodes then the process 800 proceeds to block 828, wherein the hub associated with the result value retrieved in block 804 is identified as an error node. In some embodiments, this can include associating the first value indicative of the error node with the hub.

Returning again to decision state 818, if it is determined that there are no intermediate result values, or after the error nodes are identified in block 828, the process 800 proceeds to block 829, wherein the source hub 602 of the identified message is identified. In some embodiments, the source hub 602 can be identified based on data stored in the transmission database. After the source node has been identified, the process 800 proceeds to decision state 830, wherein it is determined whether to repeat the transmission path, or in other words, whether the same hubs, and more specifically the same intermediate hubs, should be used in retransmitting the message. In some embodiments, this determination can be made based on information stored in the transmission database 311 relating to the one or several hubs. Specifically, in some embodiments, a new transmission path can be selected if one or more of the hubs has been identified as an error hub more than a threshold number of times or if, the percent of transmissions in which the hub is identified as an error hub one or more of the hubs exceeds a threshold value.

If it is determined to not repeat the transmission path, then the process 800 proceeds to block 832, wherein a new transmission path is identified. In some embodiments, the new transmission path can be generated according to one or several rules such as, for example, that the transmission path should include the minimum number of necessary nodes, that the transmission path should maximize transmission speed, or the like. After the new transmission path has been identified, or returning again to decision state 830, if it is determined to repeat the previous transmission path, the process 800 proceeds to block 834 wherein a resend request is generated and sent by, for example, the server 102 to the source node 602 and/or other nodes in the transmission path.

Figure 9:
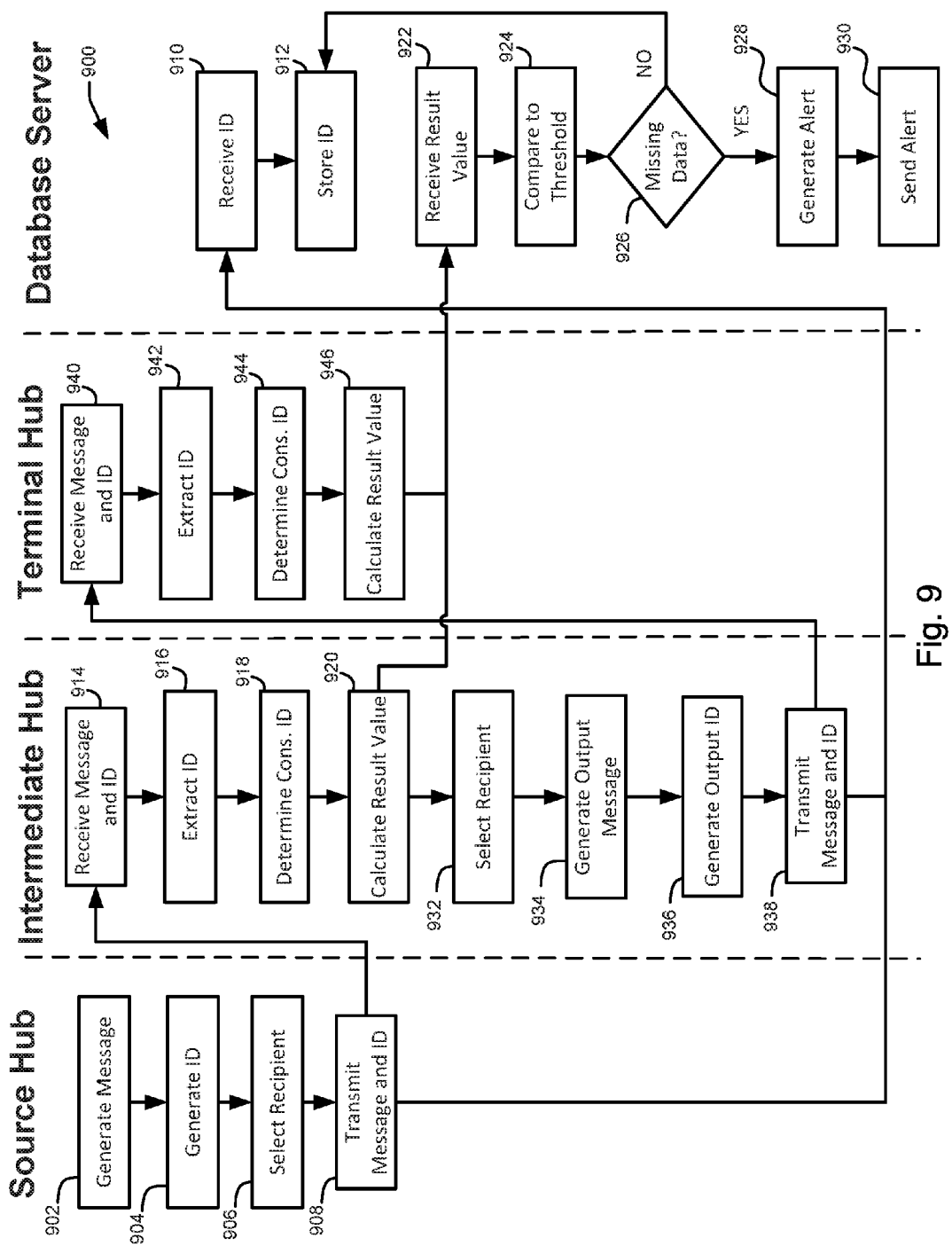
FIG. 9 is a swim lane diagram showing one embodiment of the process for transmitting a message across a plurality of hubs.

With reference now to FIG. 9, a swim lane diagram showing one embodiment of the process 900 for transmitting a message across a plurality of hubs 602, 604, 606 is shown. The process 900 begins at block 902, wherein the source hub 602 generates and/or identifies a message for transmission. After the message has been generated and/or identified, the process 900 proceeds to block 904, wherein a message identifier is generated. In some embodiments, the message identifier can be generated as described with respect to block 704 of FIG. 7.

After the message identifier has been generated, the process 900 proceeds to block 906, wherein a recipient hub is selected and/or identified. After the recipient hub has been identified and/or selected, the process 900 proceeds to block 908, wherein the message and message identifier are transmitted. In some embodiments, the message and the message identifier can be transmitted to another hub such as, for example, an intermediate hub 604 or a terminal hub 606, and in some embodiments, the message identifier can be transmitter to the database server 104, and specifically to the transmission database 311.

After the message and message identifier have been transmitted, the process 900 proceeds to block 910, wherein the message identifier is received by the database server 104, and then the process 900 proceeds to block 912, wherein the message identifier is stored in the database server 104, and specifically is stored in the transmission database 311 of the database server 104.

Also, after the message and message identifier have been transmitted, the process 900 proceeds to block 914, wherein the message and message identifier are received by the intermediate hub 604. After the message and message identifier have been received by the intermediate hub 604, the process 900 proceeds to block 916, wherein the message identifier is extracted. In some embodiments, this can include identifying the message identifier from the data received from the source hub 602.

After the message identifier has been extracted, the process 900 proceeds to block 918, wherein the consumed value is determined. In some embodiments, the consumed identifier can be determined as discussed with respect to block 712 of FIG. 7. After the consumed identifier is determined, the process 900 proceeds to block 918, wherein the result value, and particularly wherein the intermediate result value is generated. In some embodiments, the result value can be generated as discussed with respect to block 714 of FIG. 7.

After the result value has been generated, the result value can be sent to the database server 104, and the result value can be received by the database server 104 as indicated at block 922. After the result value has been received, the process 900 proceeds to block 924, wherein the result value is compared to the threshold value as discussed in block 808 of FIG. 8. After the result value has been compared to the threshold value, the process 900 proceeds to decision state 926, wherein it is determined if there is a mismatch between the generated message and the received message, or alternatively if any of the data from the generated message is missing from the received message. If it is determined that the generated message matches the received message, then the process 900 returns to block 912, wherein the result value is stored in the database server 104.

Returning again to decision state 926, if it is determined that there is a mismatch between the generated message and the received message, then the process 900 proceeds to block 928, wherein an alert is generated, and then the process proceeds to block 930, wherein the alert is sent. In some embodiments, the alert can identify that the data transmission failed and can include a prompt for a user input to restart the transmission.

Additionally, if a mismatch is identified in block 926, in some embodiments, the process 900 can include the generation and/or sending of a resend request as discussed above with respect to block 830 through 834 of FIG. 8.

Returning again to block 920, after the result value has been calculated, the process 900 proceeds to block 932, wherein a recipient is selected. In some embodiments, the recipient can be the next hub which can be either another intermediate hub 604 or the terminal hub 606. After the recipient has been selected, the process 900 proceeds to block 934, wherein the output message is generated. In some embodiments, the output message can be generated as discussed above with respect to block 722 of FIG. 7.

After the output message has been generated, the process 900 proceeds to block 936, wherein an output message identifier is generated. In some embodiments, the output message identifier can be generated as discussed above with respect to block 724 of FIG. 7. After the output message identifier has been generated, the process 900 proceeds to block 938, wherein the output message and the output message identifier are transmitted. In some embodiments, the output message and the output message identifier can be transmitted to another hub such as, for example, an intermediate hub 604 or a terminal hub 606, and in some embodiments, the output message identifier can be transmitter to the database server 104, and specifically to the transmission database 311.

After the output message and output message identifier has been transmitted, the process 900 can proceed to block 910 and proceed as outlined above. Additionally, after the output message and output message identifier has been transmitted, the process 900 can proceed to block 940, wherein the output message and output message identifier are received by the terminal hub 606. After the output message and output message identifier are received by the terminal hub 606, the process 900 proceeds to block 942, wherein the output message identifier is extracted from the received data. After the output message identifier has been extracted, the process 900 proceeds to block 944, wherein a consumed identifier is generated. In some embodiments, the consumed identifier can be generated as discussed above with respect to block 712 of FIG. 7.

After the consumed identifier has been generated, the process 900 proceeds to block 946, wherein a result value is generated, and specifically, wherein the final result value is generated. In some embodiments, the result value can be generated as discussed above with respect to block 714 of FIG. 7. After the result value has been generated and/or calculated, the result value can be transmitted to, for example, the database server 104. The database server 104 can receive the result value as indicated in block 922, and the process 900 can then proceed as outline above.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for verifying end-to-end data consistency, the system comprising:
a source hub comprising a computing device, wherein the source hub is configured to:
generate a first message from data received from a user; and
generate an initial message identifier, wherein the initial message identifier identifies content of the first message;
an intermediate hub comprising a second computing device connected to the source hub via a communication network, wherein the intermediate hub is configured to:
receive the first message from the source hub via the communication network;
receive the initial message identifier from the source hub via the communication network;
transmit an output message; and
generate an output message identifier, wherein the initial message identifier identifies content of the output message; and
a terminal hub comprising a third computing device connected to the intermediate hub via the communication network, wherein the terminal hub is configured to:
receive the output message;
receive the output message identifier;
calculate a result value from the received output message and the received output message identifier; and
provide an alert to a user device when a data loss is identified based on the result value.

2. The system of claim 1, wherein the terminal hub is configured to generate a received message value from the received output message.

3. The system of claim 2, wherein the received message value comprises a binary representation of all or portions of the received output message.

4. The system of claim 3, wherein the received message value is calculated by applying a hash function to the received output message.

5. The system of claim 3, wherein the result value is calculated via a XOR operation on the received output message identifier and the received message value.

6. The system of claim 5, wherein the terminal hub is further configured to alert the source hub to retransmit the first message.

7. The system of claim 6, wherein retransmitting the first message comprises:
regenerating the first message; and
regenerating the initial message identifier.

8. The system of claim 7, wherein the terminal hub is further configured to alert the intermediate hub to retransmit the output message, wherein retransmitting the output message comprises regenerating the output message identifier.

9. The system of claim 8, wherein the intermediate hub is configured to calculate a check value in response receiving an alert to retransmit the output message.

10. The system of claim 9, wherein the check value is calculated by applying a XOR operation to the received first message and the received initial message identifier.

11. A method of identifying missing data via a generation of a result value, the method comprising:
receiving a communication at a node comprising a first computing device from a previous node comprising a second computing device via a communications network, wherein the communication comprises data;
receiving an existing value from the previous node via the communications network, wherein the existing value comprises an output of a calculation performed by the previous node;
calculating at the node with the first computing device a consumed message identifier based on the data of the received communication, wherein the consumed message identifier comprises a plurality of binary values representative of the data of the received communication;
calculating a result value at the node with the first computing device, wherein the result value is calculated based on the received existing value and the consumed message identifier;
determining at the node with the first computing device a data loss based on the result value; and
transmitting an alert identifying the data loss via the communications network.

12. The method of claim 11, wherein the result value is calculated by a XOR operation of the existing value and the consumed message identifier.

13. The method of claim 12, wherein the data loss is determined when the result value is non-zero.

14. The method of claim 12, wherein the received communication comprises a single message.

15. The method of claim 12, wherein the received communication comprises a plurality of messages, and wherein a consumed message identifier is calculated for each of the messages in the received communication.

16. The method of claim 15, wherein the alert comprises a request for retransmission of the communication from the previous node to the node.

17. The method of claim 16, further comprising:
generating an output communication, wherein the output communication contains the data of the received communication;
generating at the node with the first computing device an output communication identifier based on the data of the output communication, wherein the output communication identifier comprises a plurality of binary values representative of the data of the output communication; and
calculating an output value at the node with the first computing device, wherein the output value is calculated based on the received existing value and the consumed message identifier and the output communication identifier.

18. The method of claim 17, wherein the output value is calculated by a XOR operation of the existing value and the consumed message identifier and the output communication identifier.

19. The method of claim 17, further comprising:
identifying a next node;
sending the output communication to the next node; and
sending the output value to the next node.

20. The method of claim 19, further comprising sending at least one of: (1) the result value; and the output value to a database.

* * * * *